(12) United States Patent
Okabe et al.

(10) Patent No.: US 6,187,706 B1
(45) Date of Patent: *Feb. 13, 2001

(54) SILICON NITRIDE SINTERED BODY AND METHOD OF PRODUCING THE SAME

(75) Inventors: Masanori Okabe; Kagehisa Hamazaki, both of Saitama (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/807,539

(22) Filed: Feb. 28, 1997

(30) Foreign Application Priority Data

Feb. 28, 1996 (JP) ................................. 8-041828
Mar. 1, 1996 (JP) ................................. 8-044691
Jul. 15, 1996 (JP) ................................. 8-184464

(51) Int. Cl.$^7$ .......................... C04B 35/587; C04B 35/596
(52) U.S. Cl. ................... 501/97.1; 501/97.2; 501/97.4; 264/647; 264/653; 264/683
(58) Field of Search ....................... 501/97.2, 97.4, 501/97.1; 264/647, 653, 683

(56) References Cited

U.S. PATENT DOCUMENTS

| 4,769,350 | * | 9/1988 | Nishioka et al. | 501/97.4 |
| 4,891,342 | * | 1/1990 | Yokoyama | 501/97.2 |
| 4,902,653 | * | 2/1990 | Komatsu et al. | 501/97.2 |
| 5,114,888 | | 5/1992 | Mizuno et al. | 501/96 |
| 5,384,292 | * | 1/1995 | Matsui et al. | 501/97.4 |
| 5,439,856 | * | 8/1995 | Komatsu | 501/97.4 |

FOREIGN PATENT DOCUMENTS

| 0 227 471 | 7/1987 | (EP) . |
| 61-201666 | 9/1986 | (JP) . |
| 62-153169 | 7/1987 | (JP) . |
| 63-100067 | 5/1988 | (JP) . |
| 63-206350 | 8/1988 | (JP) . |
| 63-206358 | 8/1988 | (JP) . |
| 5-15667 | 3/1993 | (JP) . |
| 6-234571 | 8/1994 | (JP) . |
| 6-287066 | 10/1994 | (JP) . |
| 6-305838 | 11/1994 | (JP) . |

\* cited by examiner

Primary Examiner—Karl Group
(74) Attorney, Agent, or Firm—Lyon & Lyon LLP (57) ABSTRACT

There is disclosed a silicon nitride sintered body produced by sintering a molded article which comprises a mixture of a silicon nitride powder as the main component and plural kinds of sintering additives, wherein said silicon nitride powder is set to be 0.1 to 1.0 μm in average grain size, and said plural kinds of sintering additives includes first and second sintering additives, said first sintering additive comprising oxide powders of at least one element of Group 3a element, said second sintering additive comprising oxide powders of at least one element selected from Zr (zirconium), Hf (hafnium), Nb (niobium), Ta (tantalum) and W (tungsten), said first sintering additive having the average grain size set to be 0.1 to 10 times as large as the average grain size of said silicon nitride powder and being incorporated in an amount ranging from 0.1 to 10% by weight to the mixture, said second sintering additive being such particles as that part of the particles are of grain size in the range from 10 to 100 times as large as the average grain size of said silicon nitride powder but the number of such part of the particles is in the 5 to 50% range of the total particle number and being incorporated in an amount ranging from 0 to 10% by weight to the mixture (provided that 0% by weight is not included). The sintering process of the molded article comprises a primary sintering in an atmosphere containing a nitrogen gas under the atmospheric pressure from 1 to 20 kgf/cm$^2$ at 1600–1800° C., and subsequently secondary sintering in an atmosphere containing a nitrogen gas under the atmospheric pressure ranging from 100 to 2000 kgf/cm$^2$ at a temperature lower than that of primary sintering.

8 Claims, 5 Drawing Sheets

First phase appearance ($\beta$-type silicon nitride)
Second phase appearance (composite oxides)
Third phase appearance (Periodic Table Group 3a elements oxides + $SiO_2$)

FIG. 5(b)

$Y_2O_3$, $HfO_3$ SYSTEM ⟹ Hf and the like become rich.

Second phase
Phase boundary
Third phase
There is no clear phase boundary.

SILICON NITRIDE SINTERED BODY AND METHOD OF PRODUCING THE SAME

BACKGROUND OF THE INVENTION

1. Field of the Invention

The present invention relates to a silicon nitride sintered body excellent in heat resistance under high temperature environments and a method of producing the same. More particularly, the present invention relates to a silicon nitride sintered body which is produced by sintering a material in which at least an oxide of the Periodic Table Group 3a elements is incorporated in the silicon nitride powder as a sintering additive, at two stages, i.e., primary and secondary sintering stages under predetermined conditions so as to provide the silicon nitride sintered body having high-temperature strength higher than that of a conventional silicon nitride sintered body, and relates to a method of producing such a silicon nitride sintered body.

2. Description of the Related Art

In general, a silicon nitride sintered body is known to be excellent in the high-temperature strength and toughness. Therefore, various studies have been conducted for using such silicon nitride sintered bodies as parts of structural members, such as a turbine rotor of a gas turbine, a nozzle, a duct, a combustion chamber and the like, which are operated in severe environments at high temperatures and high pressures.

For example, since combustion efficiency of the gas turbine is improved with a rise of inlet temperature at an entrance of the turbine, various studies of silicon nitride sintered bodies have been conducted for aiming at further improvements of their high-temperature strengths because they have high-temperature strengths greater than heat-resistant alloys such as Inconel and the like which have heretofore been used as the structure members and due to their relatively high toughness in comparison with the other ceramic materials.

Thus, the silicon nitride sintered body is originally excellent in high-temperature resistance, however, there have been proposals for improving the high-temperature strength.

Since the silicon nitride is a substance having high covalent bond and therefore poor in sinterability obtained by sintering a single component material thereof, it has generally been required for its sintering to beforehand mix it with a sintering additive, such as aluminum oxide, yttrium oxide, magnesium oxide and cerium oxide to improve the sinterability. However, the high-temperature characteristic is deteriorated due to the added sintering additive. Therefore, in order to improve the high-temperature characteristics, trials to incorporate oxides as sintering additives having high eutectic temperatures with $SiO_2$ existing on a surface of silicon nitride have been carried out. However, it offers a problem that as the eutectic temperature increases, the sinterability decreases.

Furthermore, if it has a simple shape, it is possible to help sintering by a method incorporating a small amount of sintering additive and using a hot press. But, it is not suitable for a complicated part shape. Furthermore, the sintering additive exists in an amorphous state in the grain boundary of a silicon nitride sintered body, causing deterioration of the high-temperature strength. Therefore, various trials have been conducted for improving the high-temperature strength by crystallizing the sintering additive existing in the amorphous state, or by performing sintering with a sintering additive in an amount as small as possible.

Furthermore, such a study has been conducted as to improve the high-temperature strength of the silicon nitride sintered body by using a sintering additive excellent in high-temperature strength. For example, Japanese laid-open patent publication No. 61-201666 discloses that, in order to improve the high-temperature strength and toughness, oxide of hafnium and zirconium are dispersed in the matrix of silicon nitride in a specified ratio. Also, Japanese laid-open patent publication No. 62-153169 discloses that, in order to improve the high-temperature strength, oxides of rare-earth elements in a specified amount and at least one kind selected from the groups of oxides, carbides or suicides of Hf, Ta or Nb are added to a mixture of silicon nitride in a specified ratio.

However, sufficient high-temperature strength has not always been obtained only by using these sintering additives having high high-temperature strength.

Therefore, in Japanese Patent publication No. 5-15667, there is disclosed that, in order to improve the strength more than $20kg/mm^2$ compared to the conventional silicon nitride sintered body, by setting an average grain size and the maximum grain size of the silicon nitride powder and the sintering additive in a predetermined range. The proposal disclosed therein, however, aims mainly at the improvement of the room-temperature strength, and it cannot be the that it is sufficient with regard to the high-temperature strength.

Figure 6A:
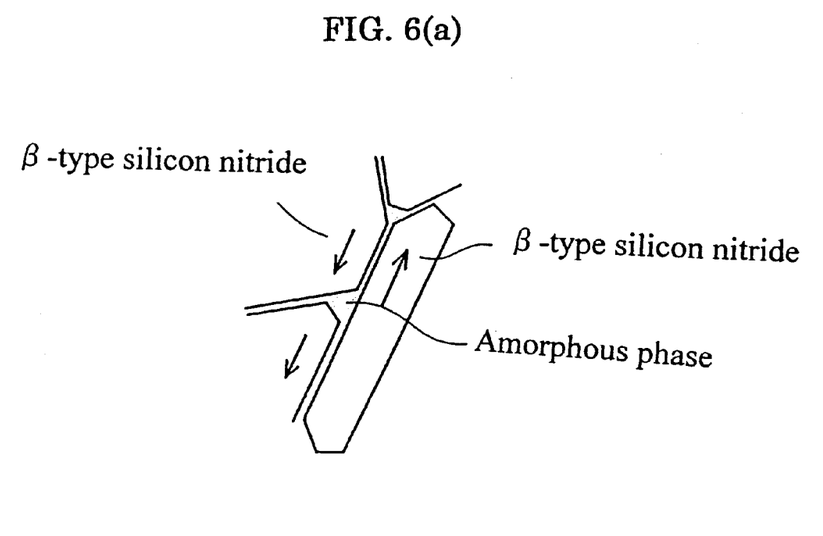
FIG. 6(a) is a view showing the state before the grain boundary slip being caused and 6(b) is a view showing the state after the grain boundary slip being caused, among the structural view of conventional silicon nitride sintered body.
Figure 6B:
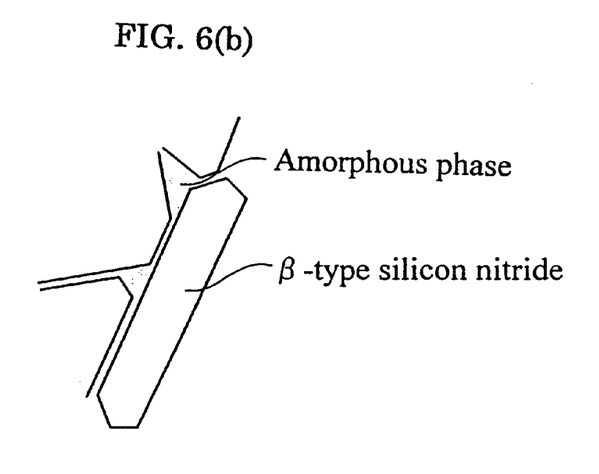

Furthermore, studying the deterioration mechanism in association with the high-temperature characteristics of the silicon nitride sintered bodies produced by means of the conventional art from the view point of a systematic structure, FIG. 6 is the general structural view of the silicon nitride sintered body by means of the conventional art. As is obvious from FIG. 6(a), when a shear stress acts on silicon nitride particles in this state at a high temperature, grain boundary slip tends to occur as shown in FIG. 6(b) since only amorphous sintering additive exists in the gap between particles. Therefore, it may be considered that even if the silicon nitride sintered body is excellent in heat resistance compared to metals, it is poor in toughness.

On the other hand, as the conventional methods of manufacturing silicon nitride sintered bodies, there are disclosed in Japanese laid-open patent publication Nos. 63-100067, 63-206358, 6-234571, 6-287066 and 6-305838.

Japanese laid-open patent publication No. 63-100067 discloses that, in order to crystallize the silicon nitride grain boundary phase, a starting powder which is obtained by adding rare-earth oxides such as $Y_2O_3$ to silicon nitride is fired at 1900° C. for 2 hours in a $N_2$ atmosphere of 10 atm., and then treated at 1400° C. for 6 hours.

However, this method requires such an additional crystallizing treatment as to hold the grain boundary phase after lowering the temperature, since the sintering temperature is high, in order to crystallize the grain boundary phase.

Japanese laid-open publication No. 63-206358 discloses that at the time of hot-pressing the silicon nitride powder, the amount to be pressurized by the press is increased between a contraction-starting temperature of a silicon nitride powder molded article and a contraction-completed temperature thereof higher than the former.

In this method, however, since the sintering temperature is set to be increased at the latter half stage, abnormal grain growth tends to be caused.

Japanese laid-open patent publication No. 6-234571 discloses a crystallization procedure of the grain boundary phase by a sintering process at a temperature ranging from 1500 to 1950° C. by a glass seal HIP technique, followed by a heat treatment in a non-oxidizing atmosphere at a temperature ranging from 1000 to 1600° C.

In this method, however, first of all, the glass seal HIP method per se is complicated in its process, and the ambient pressure is not taken into account at all, therefore pores are easily caused.

Japanese laid-open patent publication No. 6-287066 discloses that the grain boundary phase of a silicon nitride crystal is crystallized by setting a temperature to fire the starting material containing silicon nitride, oxides of Group 3a elements and excessive oxygen higher than the eutectic temperature of the oxide of Group 3a elements and silicon nitride in a range from 1600 to 1950° C., and setting the sintering ambient pressure not higher than 10 atm.

In this method, however, a sintering period of time is not taken into account, and it is impossible to prevent silicon nitride from being decomposed together with prevention of generation of pores only by making the ambient pressure not higher than 10 atm.

Japanese laid-open patent publication No. 6-305838 discloses that a molded article of mixture containing a silicon nitride is fired at a temperature range from 1500 to 1700° C. in an atmosphere in which the whole pressure containing a nitrogen gas is from 0.1 to 2 atm till all open-pores disappear, followed by increase of the nitrogen atmospheric pressure and sintering temperature.

This method, however, is not suitable for a system not containing a sintering additive having a low melting point such as $Al_2O_3$ and MgO, and tends to cause abnormal grain growth.

Furthermore, in either prior art which discloses two-stage sintering, there is no indication how to determine the temperature, time and ambient pressure to be made at the primary sintering stage.

SUMMARY OF THE INVENTION

In a view of the high-temperature strength of the conventional silicon nitride sintered body as described above, the present invention is provided to further improve high-temperature strength of a silicon nitride sintered body.

Although a conventional silicon nitride sintered body was obtained typically by adding to the starting material a sintering additive excellent in high-temperature strength, the present inventors have not only added a sintering additive component excellent in high-temperature strength but also paid attention to an average grain size of a silicon nitride powder, a kind of sintering additive to be mixed with the silicon nitride powder and an average crystal grain size of the sintering additive, as well as to sintering conditions to sinter a molded article of these mixed powders, as a result of which the present invention has now be completed through a plurality of experiments and studies.

Therefore, the silicon nitride sintered body according to the present invention is obtained by:

primary sintering of a molded article which is obtained by mixing a silicon nitride powder as the main component and plural kinds of sintering additives at a temperature of from 1600 to 1800° C. in an atmosphere containing a nitrogen gas under the atmospheric pressure ranging from 1 to 20 $kgf/cm^2$, and secondary sintering at a temperature lower than the primary sintering temperature in an atmosphere containing a nitrogen gas under the atmospheric pressure ranging from 100 to 2000 $kgf/cm^2$.

The plural kinds of sintering additives include, for example, a first sintering additive comprising an oxide powder of at least one kind of the Periodic Table Group 3a elements, and a second sintering additive comprising an oxide powder of at least one element selected from Zr (zirconium), Hf (hafnium), Nb (niobium), Ta (tantalum) and W (tungsten).

An average grain size of the silicon nitride powder as the main component is set to be from 0.1 to 1.0 $\mu$m. The first sintering additive has an average grain size set to be 0.1 to 10 times as large as the average grain size of the silicon nitride powder and is incorporated in an amount ranging from 0.1 to 10% by weight to the mixture. Also, the second sintering additive is such particles that part of the particles are of grain size in the range from 10 to 100 times as large as the average grain size of the silicon nitride powder but the number of such part of the particles being in the 5 to 50% range of the total particle number, and is incorporated in an amount ranging from 0 to 10% by weight to the mixture (provided that 0% by weight is not included).

On the other hand, the silicon nitride sintered body obtained as the result of the primary and secondary sintering treatments comprises:

a first phase including , β-type silicon nitride in a pillar form, a second phase including oxides of at least one element selected from Zr (zirconium), Hf (hafnium), Nb (niobium), Ta (tantalum) and W (tungsten) or composite oxides of these oxides as mentioned immediately above and oxides of at least one element selected from the Periodic Table Group 3a elements, and and a third phase mainly including oxides of at least one element selected from the Periodic Table Group 3a elements.

In particular, it is preferred in a structure of the silicon nitride sintered body thus obtained that the second phase be present among β-type silicon nitride particles forming the first phase.

DESCRIPTION OF THE PREFERRED EMBODIMENTS

Hereinafter, a silicon nitride sintered body according to the present invention and a method of producing the same will now be described in detail, using preferred embodiments with reference to accompanying drawings.

First, the silicon nitride sintered body according to a first embodiment of the present invention is obtained by molding a mixed powder in which a first sintering additive and a second sintering additive are incorporated to a silicon nitride powder as a main component and by sintering the molded article. In this case, it is so set that an average grain size of the silicon nitride powder as the main component is 0.1 to 1.0 μm, an oxide powder of at least one element of the Group 3a elements is used as the first sintering additive, an oxide powder of at least one element selected from Zr (zirconium), Hf (hafnium), Nb (niobium), Ta (tantalum) and W (tungsten) is used as the second sintering additive. An average grain size of the first sintering additive is 0.1 to 10 times as large as the average grain size of the silicon nitride powder. As for the second sintering additive, the total number of particles whose grain size is 10 to 100 times as large as the average grain size of the silicon nitride powder is from 5 to 50%, and the incorporating ratio is from 0 to 10% by weight (provided that 0% by weight is not included).

As the silicon nitride powder used in this embodiment, silicon nitride powders prepared by an imide method or by a direct nitriding method may be used, but in order to obtain sufficient high-temperature strength, the one prepared by the imide method is preferred.

Furthermore, the average grain size of the silicon nitride powder is to be 0.1 to 1.0 μm. If its average grain size is not larger than 0.1 μm, when the sintered body is loaded at a high temperature, the grain boundary slip is easily caused, thereby the high-temperature strength is deteriorated. If its average grain size is not smaller than 1.0 μm, a grain growth is caused during the sintering process, thereby the high-temperature strength is deteriorated. As for the shape of silicon nitride powder, roughly spherical shape is preferable.

Here, an average grain size specified in the present first embodiment means the grain size whose cumulative frequency is 50% (hereinafter referred to as "D50") in a cumulative distribution curve of grain sizes, grain size being plotted on the abscissa and cumulative number of grains being plotted on the ordinate.

Furthermore, in order to increase the strength of the sintered body, it is required to adjust properly an average grain size of the sintering additives according to an average grain size of the silicon nitride powder to be used. That is, the average grain size of the oxide powder of the Group 3a elements as the first sintering additive is set to be 0.1 to 10 times as large as the average grain size of the silicon nitride powder. If an average grain size of the first sintering additive is not larger than 0.1 times or not smaller than 10 times, the first sintering additive is hardly mixed uniformly with the silicon nitride powder, thus the sinterability is deteriorated. Therefore, the first sintering additive has preferably an average grain size of from 0.5 to 5 times as large as the average grain size of the silicon nitride powder, more preferably its average grain size should be set to be roughly the same as that of the silicon nitride powder.

Furthermore, the oxide powder of the Group 3a elements is incorporated in an amount of from 0.1 to 10% by weight. If the amount is not larger than 0.1% by weight, the sinterability is deteriorated and thus sintering becomes substantially difficult. If the amount exceeds 10% by weight, the strength at a high temperature is deteriorated. More preferably, the amount is from 1 to 5% by weight. In addition, when more than two kinds of oxides of the Group 3a elements are incorporated, it is not always necessary that average grain sizes thereof are identical. So long as the average grain sizes thereof are in the above-mentioned range, they may be different from each other in average grain size on condition that their total amounts to be incorporated be within this range.

As the Group 3a elements constituting the first sintering additive, there may be mentioned Y, lanthanoid-type rare-earth elements, and actinoid-type rare-earth elements, but an element selected from Y, Yb and Lu is preferable. It is a matter of course that more than two kinds of such elements may be incorporated to the silicon nitride powder mixture simultaneously.

Oxides of Zr, Hf, Nb, Ta and W constituting the second sintering additive are well known for an action to increase the high-temperature strength of the silicon nitride sintered body. As an average grain size thereof, it is preferred to be 10 to 100 times as large as the average grain size of the silicon nitride powder. However, it is not necessary to set the grain size of all particles of oxides of Zr, Hf, Nb, Ta and W within the above-mentioned range. When the total particle number of oxides of Zr, Hf, Nb, Ta and W is designated as 100, 5 to 50% thereof should be in the above-mentioned range. That is, the second sintering additive is such particles as that part of the particles are of grain size in the range from 10 to 100 times as large as the average grain size of said silicon nitride powder but the number of such part of the particles is in the 5 to 50% range of the total particle number.

The reason is that if the grain size is not larger than 10 times as large as the average grain size of the silicon nitride powder, the effect to prevent a grain boundary slip is lost at a high temperature, and if it is not smaller than 100 times, it causes a notch acuity in the silicon nitride powder, becoming a breaking point. Therefore, more preferably, the grain size thereof should be in a range of from 15 to 50 times as large as the average grain size of the silicon nitride powder. Moreover, when the total particle number thereof is not larger than 5% in the whole, almost all oxides incorporated therein work as a sintering additive, and cannot exert the high-temperature strength. If the total particle number thereof is not smaller than 50%, massive phase of oxides remaining in the crystal grain boundary becomes large, to work as a defect, leading to decrease of the strength.

When more than two kinds of these oxide powders are incorporated, it is not always necessary that the grain distributions thereof are the same, and the total particle number whose grain size is 10 to 100 times as large as the average grain size of the silicon nitride powder may be proper to be in the above-mentioned range. In order to increase the strength of the sintered body, it is required to adjust properly the grain size of the oxide powder of these elements in the above-mentioned range, according to the grain size of the silicon nitride powder to be used.

Furthermore, as the amount to be incorporated of oxides of elements selected from Zr, Hf, Nb, Ta and W, 0 to 10% by weight is preferable (provided that 0% by weight is not included). These elements have effect even if they are in quite small amount, but if they are incorporated in a large amount, the sinterability is deteriorated due to the large average grain size thereof. Therefore, the amount to be incorporated should be not larger than 10% by weight. More preferably, the amount to be incorporated should be from 1 to 5% by weight. When more than two kinds of these oxide powders are incorporated, the total amount to be incorporated may be proper to be in this range.

On the other hand, the method of producing the silicon nitride sintered body of the first embodiment comprises molding a mixed powder comprising a silicon nitride powder as the main component, a first sintering additive, and a second sintering additive, performing the primary sintering at a temperature of from 1600 to 1800° C., in an atmosphere containing a nitrogen gas under the atmospheric pressure ranging from 1 to 9 kgf/cm², and then performing the secondary sintering at a temperature similar to, or lower than the primary sintering temperature in an atmosphere containing a nitrogen gas under atmospheric pressure ranging from 100 to 2000 kgf/cm². In addition, the average grain sizes, incorporating ratios and the like of the silicon nitride powder, the first and second sintering additives are similar to those mentioned above.

It is necessary to uniformly mix the silicon nitride powder and the oxide powders as sintering additives before being molded. As the device used in the mixing, there can be mentioned a ball mill, an agitating mill and the like, and either dry pulverization or wet pulverization can be used. As the solvent at the time of wet pulverization, there can be mentioned ethyl alcohol, methyl alcohol and the like.

After the silicon nitride powder and the sintering additives are mixed, processes such as drying, granulation and classification are performed depending on a kind of the molding method. As the molding method, there can be mentioned press molding, slip cast molding, high-pressure injection molding (usual injection molding), low-pressure injection molding, cold isostatic pressing (CIP), hot press and the like. In the producing method according to the first embodiment, the molding method is not limited only to those described above, and any molding method may be effective.

In addition, in order to obtain a molded article of a high density with the freedom of shape suitable therefor and a fair productive efficiency thereof, it is preferred to use CIP or low-pressure injection molding after press molding.

The molded article is subjected to the primary sintering at a temperature range of from 1600 to 1800° C. in an atmosphere containing a nitrogen gas. If the sintering temperature is not higher than 1600° C., the sintering reaction is hardly progressed, and if the sintering temperature is not lower than 1800° C., the crystal grains of silicon nitride become huge to deteriorate the strength. Moreover, the reason why the sintering is performed in an atmosphere containing a nitrogen gas is that it is possible to prevent the decomposition of the silicon nitride, in particular under the atmospheric pressure ranging from 1 to 9 kgf/cm². If the pressure is not higher than 1 kgf/cm², silicon nitride is decomposed, and if the pressure exceeds 9 kgf/cm², pores are sealed in the sintered body and it may be difficult to densely form the sintered body.

During the primary sintering process, the sintered body is densely formed, and during the subsequent secondary sintering process, the sintered body is uniformly pressed over the surface in a pressurized atmosphere to break pores, thus the density of the sintered body is increased and the strength thereof is improved.

The primary sintering is performed till the relative density becomes roughly higher than 90%. The time required for the primary sintering differs depending on the size and the thickness of the sintered body, but it is about 1 to 24 hours. More preferably, it is 4 to 12 hours. If the sintering time is less than 1 hour, the density of the sintered body is not sufficiently increased, and the effect of the secondary sintering could not be obtained. If the sintering time is longer than 24 hours, excessive crystal grain growth tends to be caused.

The subsequent secondary sintering is performed at a temperature similar to, or lower than the primary sintering temperature, and not lower than 1600° C., in an atmosphere containing a nitrogen gas. If the secondary sintering temperature exceeds the primary sintering temperature, the crystal grains of silicon nitride become huge, and the huge grain causes the deterioration of the strength. In addition, the sintering reaction is hardly progressed unless the temperature is not lower than 1600° C. The atmospheric pressure containing a nitrogen gas is preferably from 100 to 2000 kgf/cm². If the atmospheric pressure is not higher than 100 kgf/cm², the sintering reaction is hardly progressed, and the sintered body is not densely formed sufficiently.

When the atmospheric pressure exceeds 2000 kgf/cm², the densification is saturated, therefore densifying reaction does not progress any more. On the contrary, if the atmospheric pressure becomes higher than that, excess growth of huge grains tends to be caused.

Now, various experimental examples (inventive examples) according to the first embodiment of the present invention performed based on the above-mentioned consideration will be described. These experimental examples do not impose any limitation upon the present invention.

INVENTIVE EXAMPLE 1

Figure 1:
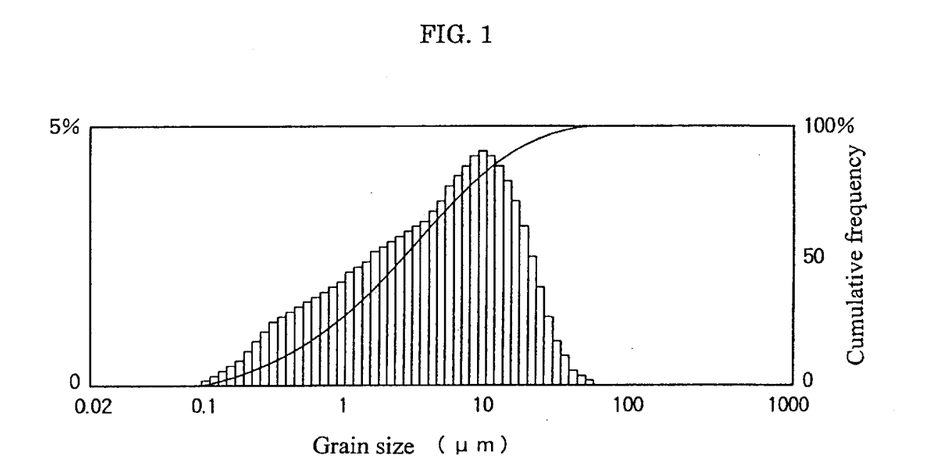
FIG. 1 is a graph showing a grain size distribution curve of sintering additives used in the inventive examples 1 to 13 according to the first embodiment of the present invention.

In a ball mill containing balls made of silicon nitride were mixed 480 g of silicon nitride powder (produced by Ube Kosan, A34×05) having an average grain size of 0.5 $\mu$m, 12.5 g (2.5% by weight) of ytterbium oxide (produced by Nippon Yttrium, YHC3940620) having a grain size of 0.94 $\mu$m of which the cumulative frequency on the cumulative distribution curve corresponds to 50%, 7.5 g (1.5% by weight) of hafnium oxide (manufactured by Somekawa Rikagaku, 33238A) 325 mesh (average grain size: 5$\mu$, maximum grain size: 50 $\mu$m, FIG. 1 shows a grain size distribution curve by means of a laser analysis scattering-type grain distribution measuring device. D50*10–D50*100 is 48%.), and 500 g of ethanol as a solvent for 60 hours.

After drying this mixed powder by using a rotary evaporator, the dried powder was passed through a sieve of 325 mesh, press molded at a molding pressure of 200 kg/cm² in a mold, and subjected to CIP (cold isostatic pressing) at a pressure of 4000 kg/cm² to make a test piece of 50 mm (length)×32 mm (width)×8 mm (thickness).

A test piece was subjected to primary sintering in an atmosphere containing a nitrogen gas under the atmospheric pressure of 9 kgf/cm² at 1800° C. for 4 hours to obtain a sintered body having a relative density of 92%. Furthermore, the test piece was subjected to secondary sintering in an atmosphere containing a nitrogen gas under the atmospheric pressure of 200 kgf/cm² at 1800° C. for 2 hours to obtain a sintered body having a relative density of 95%.

This sintered body was subjected to three-point bending strength test conforming to JIS1601 at 1250° C. and 1450° C. The test result is shown in Table 1.

INVENTIVE EXAMPLE 2

In a ball mill containing balls made of silicon nitride were mixed 960 g of silicon nitride powder (produced by Ube Kosan, A34×05) having an average grain size of 0.5 $\mu$m, 25 g (2.5% by weight) of ytterbium oxide (produced by Nippon Yttrium, YHC3940620) having a grain size of 0.94 $\mu$m of which the cumulative frequency on the cumulative distribution curve corresponds to 50%, 15 g (1.5% by weight) of hafnium oxide (same material used in the inventive example 1) and 1000 g of ethanol as a solvent for 60 hours.

After drying this mixed powder by using a rotary evaporator, 866.88 g was weighed, and 153.05 g of paraffin, 17.53 g of stearic acid and 9.83 g of dispersing agent were added thereto, and the mixture was kneaded by a kneader at 90° C. for 2 hours. Thereafter, the kneaded product was molded in a mold at a temperature of 41° C. at a molding pressure of 6 kgf/cm² to obtain a molded article of 50 mm×31 mm×10 mm.

This molded article was degreased in the air at 500° C., and subjected to primary sintering in an atmosphere containing a nitrogen gas under the atmospheric pressure of 9 kgf/cm² at 1800° C. for 8 hours to obtain a sintered body having a relative density of 92%, and further subjected to secondary sintering in an atmosphere containing nitrogen gas under the atmospheric pressure of 200 kgf/cm² at 1800° C. for 2 hours to obtain a sintered body having a relative density of higher than 95%.

This sintered body was subjected to three-point bending strength test conforming to JIS1601 at 1250° C. and 1450° C. The test result is shown in Table 1.

INVENTIVE EXAMPLE 3

A test piece was prepared in the same manner as in the inventive example 1, except that the amount to be added of ytterbium oxide was 1% by weight and the amount to be added of hafnium oxide was 1% by weight, and the test piece was subjected to the strength test in the same manner as in the inventive example 1. The obtained result is shown in Table 1.

INVENTIVE EXAMPLE 4

A test piece was prepared in the same manner as in the inventive example 1, except that the amount to be added of ytterbium oxide was 1.5% by weight and the amount to be added of hafnium oxide was 1.5% by weight, and the test piece was subjected to the strength test in the same manner as in the inventive example 1. The obtained result is shown in Table 1.

INVENTIVE EXAMPLE 5

A test piece was prepared in the same manner as in the inventive example 1, except that the amount to be added of ytterbium oxide was 1.5% by weight and the amount to be added of hafnium oxide was 2.5% by weight, and the test piece was subjected to the strength test in the same manner as in the inventive example 1. The obtained result is shown in Table 1.

INVENTIVE EXAMPLE 6

A test piece was prepared in the same manner as in the inventive example 1, except that the amount to be added of ytterbium oxide was 2.5% by weight and the amount to be added of hafnium oxide was 2.5% by weight, and the test piece was subjected to the strength test in the same manner as in the inventive example 1. The obtained result is shown in Table 1.

INVENTIVE EXAMPLE 7

A test piece was prepared in the same manner as in the inventive example 1, except that the amount to be added of ytterbium oxide was 3% by weight and the amount to be added of hafnium oxide was 5% by weight, and the test piece was subjected to the strength test in the same manner as in the inventive example 1. The obtained result is shown in Table 1.

INVENTIVE EXAMPLE 8

A test piece was prepared in the same manner as in the inventive example 1, except that the amount to be added of ytterbium oxide was 5% by weight and the amount to be added of hafnium oxide was 3% by weight, and the test piece was subjected to the strength test in the same manner as in the inventive example 1. The obtained result is shown in Table 1.

INVENTIVE EXAMPLE 9

A test piece was prepared in the same manner as in the inventive example 2, except that the amount to be added of yttrium oxide (manufactured by Nippon Yttrium) having an average grain size of 0.95 μm was 1.5% by weight and the amount to be added of hafnium oxide was 2.5% by weight, and the test piece was subjected to the strength test in the same manner as in the inventive example 2. The obtained result is shown in Table 1.

INVENTIVE EXAMPLE 10

A test piece was prepared in the same manner as in the inventive example 9, except that the amount to be added of yttrium oxide was 1% by weight and the amount to be added of hafnium oxide was 1% by weight, and the test piece was subjected to the strength test in the same manner as in the inventive example 9. The obtained result is shown in Table 1.

INVENTIVE EXAMPLE 11

A test piece was prepared in the same manner as in the inventive example 9, except that the amount to be added of yttrium oxide was 2.5% by weight and the amount to be added of hafnium oxide was 1.5% by weight, and the test piece was subjected to the strength test in the same manner as in the inventive example 9. The obtained result is shown in Table 1.

INVENTIVE EXAMPLE 12

A test piece was prepared in the same manner as in the inventive example 9, except that the amount to be added of yttrium oxide was 3% by weight and the amount to be added of hafnium oxide was 5% by weight, and the test piece was subjected to the strength test in the same manner as in the inventive example 9. The obtained result is shown in Table 1.

INVENTIVE EXAMPLE 13

A test piece was prepared in the same manner as in the inventive example 1, except that the amount to be added of lutetium oxide (manufactured by Nippon Yttrium) having an average grain size of 1.0 μm was 2.5% by weight and the amount to be added of hafnium oxide was 1.5% by weight, and the test piece was subjected to the strength test in the same manner as in the inventive example 1. The obtained result is shown in Table 1.

INVENTIVE EXAMPLE 14

Figure 2:
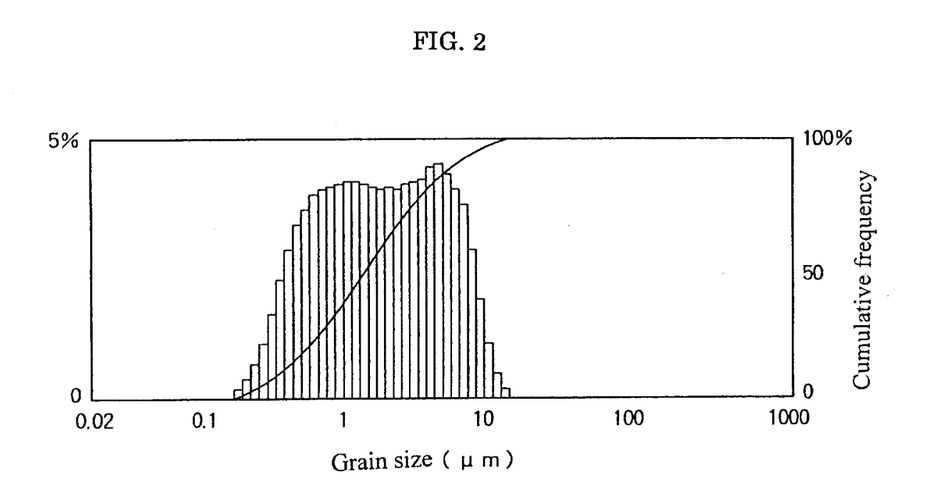
FIG. 2 is a graph showing a grain size distribution curve of sintering additives used in the inventive examples 14 to 16.

A test piece was prepared in the same manner as in the inventive example 1, except that the amount to be added of ytterbium oxide (manufactured by Nippon Yttrium) having an average grain size of 0.94 μm was 2.5% by weight and the amount to be added of hafnium oxide (FIG. 2 shows a grain size cumulative distribution curve. D50*10~D50*100 is 19%.) was 1.5% by weight, and the test piece was subjected to the strength test in the same manner as in the inventive example 1. The obtained result is shown in Table 1.

INVENTIVE EXAMPLE 15

A test piece was prepared in the same manner as in the inventive example 14, except that the amount to be added of hafnium oxide was 1.0% by weight. The test piece was subjected to the strength test in the same manner as in the inventive example 14. The obtained result is shown in Table 1.

INVENTIVE EXAMPLE 16

A test piece was prepared in the same manner as in the inventive example 14, except that the amount to be added of hafnium oxide was 0.5% by weight, and the test piece was subjected to the strength test in the same manner as in the inventive example 14. The obtained result is shown in Table 1.

COMPARATIVE EXAMPLE 1

Figure 3:
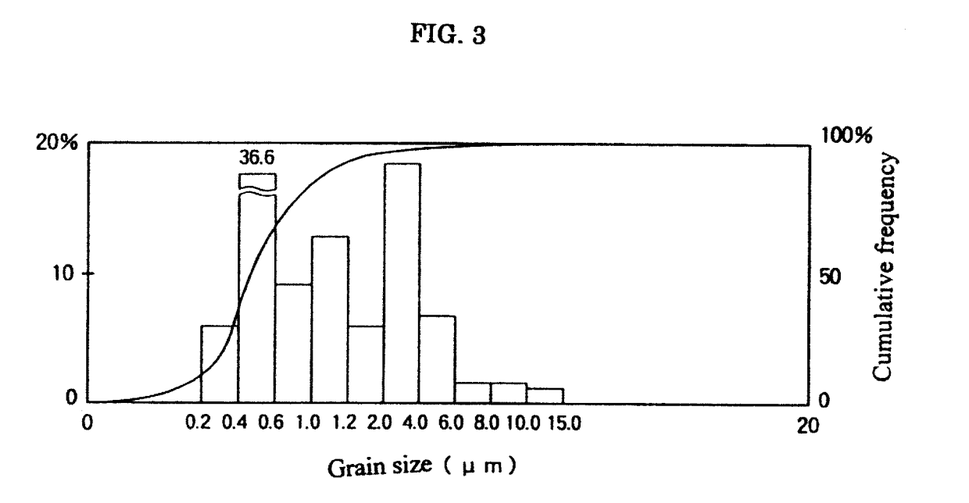
FIG. 3 is a graph showing a grain size distribution curve of sintering additives used in comparative example 1.

A test piece was prepared in the same manner as in the inventive example 1, except that the amount to be added of ytterbium oxide having an average grain size of 0.94 μm was 2.5% by weight and the amount to be added of hafnium oxide (FIG. 3 shows a grain size cumulative distribution curve. D50*10–D50*100 is 4%.) was 1.5% by weight, and the test piece was subjected to the strength test in the same manner as in the inventive example 1. The obtained result is shown in Table 1.

From Table 1, it is obvious that the three-point bending strength decreases. Taking into consideration the comparison with the inventive example 1, it may be judged that sintering additives having excellent high-temperature strength, such as hafnium oxide and the like having relatively large grain size contributes to improvement of high-temperature strength.

COMPARATIVE EXAMPLE 2

A test piece was prepared in the same manner as in the inventive example 1, except that the amount to be added of ytterbium oxide was 4% by weight and hafnium oxide was not added, and the test piece was subjected to the strength test in the same manner as in the inventive example 1. The obtained result is shown in Table 1.

From Table 1, it becomes obvious that the strength drastically decreases, especially by raising the temperature to conduct the three-point bending test from 1250° C. to 1450° C. And it can be seen that the high-temperature strength is increased by adding oxide powder of elements selected from Zr, Hf, Nb, Ta and W.

In producing the silicon nitride sintered body according to the first embodiment of the present invention described above, the average grain size of Group 3a element which is the first sintering additive is within the range of from 0.1 to 10 times as large as the average grain size of the silicon nitride powder, thereby the first sintering additive is uniformly mixed with the silicon nitride powder, exists on the outer hot periphery of the silicon nitride powder particles after being sintered to make a film having a certain thickness, and strongly bonds silicon nitride powders with each other to improve the strength of the sintered body.

Furthermore, by adding oxide powder of at least one element selected from Zr, Hf, Nb, Ta and W as the second sintering additive having high high-temperature strength, the high-temperature strength of the silicon nitride sintered body is increased. In addition, since the second sintering additive contains particles having relatively large grain size which is 10 to 100 times as large as the average grain size of the silicon nitride powder in 5 to 50%, an oxide phase having a high-melting point and having roughly the same size with the silicon nitride crystal particles is generated in the grain boundary of the silicon nitride sintered body, thereby particles in the sintered body does not easily cause grain boundary slip, and the high-temperature strength is further improved.

On the other hand, in the method of producing the silicon nitride sintered body according to the first embodiment, primary sintering conducted in a temperature range of from 1600 to 1800° C. in an atmosphere containing a nitrogen gas under the atmospheric pressure ranging from 1 to 9 kgf/cm$^2$ forms the sintered body densely, and the subsequent secondary sintering further improves the density of the sintered body. Particularly, it prevents crystal particles from becoming huge to conduct the secondary sintering at a temperature lower than that of the primary sintering in an atmosphere containing a nitrogen gas under the atmospheric

TABLE 1

| | First Sintering Additive | | | Second Sintering Additive | | | Three-Point Bending Strength (Mpa) | | |
|---|---|---|---|---|---|---|---|---|---|
| | Elements | Average Grain Size μ | Amount to be added wt % | Elements | Grain Size Distribution | Amount to be added wt % | 1250° C. | 1450° C. | Molding Method |
| INV. EX. 1 | Yb | 0.94 | 2.5 | Hf | FIG. 1 | 1.5 | 760 | 700 | Press + CIP |
| INV. EX. 2 | ↑ | 0.94 | 2.5 | ↑ | ↑ | 1.5 | 810 | 760 | L-P Injection※ |
| INV. EX. 3 | ↑ | 0.94 | 1.0 | ↑ | ↑ | 1.0 | 700 | 550 | Press + CIP |
| INV. EX. 4 | ↑ | ↑ | 1.5 | ↑ | ↑ | 1.5 | 720 | 550 | ↑ |
| INV. EX. 5 | ↑ | ↑ | 1.5 | ↑ | ↑ | 2.5 | 700 | 550 | ↑ |
| INV. EX. 6 | ↑ | ↑ | 2.5 | ↑ | ↑ | 2.5 | 600 | 500 | ↑ |
| INV. EX. 7 | ↑ | ↑ | 3.0 | ↑ | ↑ | 5.0 | 700 | 600 | ↑ |
| INV. EX. 8 | ↑ | ↑ | 5.0 | ↑ | ↑ | 3.0 | 600 | 550 | ↑ |
| INV. EX. 9 | Y | 0.95 | 1.5 | ↑ | ↑ | 2.5 | 750 | 670 | L-P Injection※ |
| INV. EX. 10 | ↑ | ↑ | 1.0 | ↑ | ↑ | 1.0 | 600 | 550 | ↑ |
| INV. EX. 11 | ↑ | ↑ | 2.5 | ↑ | ↑ | 1.5 | 600 | 550 | ↑ |
| INV. EX. 12 | ↑ | ↑ | 3.0 | ↑ | ↑ | 5.0 | 600 | 500 | ↑ |
| INV. EX. 13 | Lu | 1.0 | 2.5 | ↑ | ↑ | 1.5 | 710 | 700 | Press + CIP |
| INV. EX. 14 | Yb | 0.94 | 2.5 | ↑ | FIG. 2 | 1.5 | 720 | 720 | ↑ |
| INV. EX. 15 | ↑ | ↑ | 2.5 | ↑ | ↑ | 1.0 | 800 | 620 | ↑ |
| INV. EX. 16 | ↑ | 0.94 | 2.5 | ↑ | ↑ | 0.5 | 820 | 600 | ↑ |
| COM. EX. 1 | ↑ | 0.94 | 2.5 | ↑ | FIG. 3 | 1.5 | 720 | 440 | Press + CIP |
| COM. EX. 2 | ↑ | 0.94 | 4.0 | — | — | — | 650 | 400 | Press + CIP |

※L-P Injection = Low-Pressure Injection Molding pressure ranging from 100 to 2000 kgf/cm², thus the density of the sintered body is improved and the strength thereof increases. In addition, by conducting the sintering process in an atmosphere containing a nitrogen gas, decomposition of silicon nitride can be prevented and the sintered body can be formed densely.

Now, the silicon nitride sintered body according to a second embodiment of the present invention, which includes the second and the third phases composed of sintering additives in addition to the first phase composed of silicon nitride in the sintered body structure will be described.

According to the second embodiment of the present invention, the silicon nitride sintered comprises the first phase, the second phase and the third phase, the first phase having β-type silicon nitride in a pillar form, the second phase having oxides of at least one element selected from Zr, Hf, Nb, Ta and W or composite oxides of these oxides and oxides of at least one element selected from the Periodic Table Group 3a elements, the third phase having mainly oxides of at least one element selected from the Periodic Table Group 3a elements, and the second phase being present among β-type silicon nitride particles forming the first phase.

In addition, as the Group 3a elements, it is preferably the one selected from Y (yttrium), Yb (ytterbium) and Lu (lutetium).

Furthermore, the oxide constituting the second phase has a high melting point because Zr, Hf, Nb, Ta and W are rich therein, and the oxide constituting the second phase (composite oxide) gets into the clearance among silicon nitride particles constituting the first phase. Since this oxide (composite oxide) and the silicon nitride particles are different from each other in thermal expansion coefficient, compressive stress works on the silicon nitride particles at a high temperature, thereby even if shear stress works, the grain boundary slip is hardly caused.

As the silicon nitride powder used in the second embodiment, silicon nitride powders prepared by an imide method or by a direct nitriding method may be used, but in order to obtain high high-temperature strength, the one prepared by the imide method is preferred, as in the first embodiment described above.

An average grain size and an amount to be added of the silicon nitride powder and sintering additives in the second embodiment are roughly the same with those of the first embodiment. For example, the average grain size of the silicon nitride powder is to be 0.1 to 1.0 μm, as in the first embodiment, and the shape is preferably roughly spherical. It is required to adjust properly the average grain size of the sintering additives to be used in order to increase the strength of the sintered body, depending on the average grain size of the silicon nitride powder.

That is, the average grain size of the oxide powder of the Group 3a elements as the sintering additive is set to be 0.1 to 10 times as large as the average grain size of the silicon nitride powder, preferably 0.5 to 5 times, more preferably to be roughly the same with that of the silicon nitride powder. And the amount to be added of the oxide powder of the Group 3a elements is set to be 0.1 to 10% by weight, more preferably 1 to 5% by weight. As Group 3a elements constituting the first sintering additive, there can be mentioned Y, lanthanoid-type rare-earth elements, and actinoid-type rare-earth elements, but an element selected from Y, Yb and Lu is preferable. It is a matter of course that more than two kinds of the Group 3a elements may be incorporated simultaneously.

As an average grain size of oxides of Zr, Hf, Nb, Ta and W constituting the second phase which is well known for increasing the high-temperature strength of the silicon nitride sintered body, it is preferred to be 10 to 100 times as large as the average grain size of the silicon nitride powder which is a staring material. However, it is not necessary to set the grain size of all particles of oxides of Zr, Hf; Nb, Ta and W within the above-mentioned range. When the total particle number of oxides of Zr, Hf, Nb, Ta and W is designated as 100, 5 to 50% thereof should be in the above-mentioned range. As an amount to be added of oxides of elements selected from Zr, Hf; Nb, Ta and W, 0 to 10% by weight is preferable (provided that 0% by weight is not included). These elements are effective even if they are in quite small amount, but if they are added in a large amount, the sinterability is deteriorated due to the large average grain size thereof. Therefore, the amount to be added should be not larger than 10% by weight. More preferably, the amount to be added should be from 1 to 5% by weight. When more than two kinds of these oxide powders are incorporated, the total amount to be added may be proper to be in this range.

On the other hand, the method of producing the silicon nitride sintered body according to the second embodiment comprises molding a mixed powder comprising a silicon nitride powder as the main component, oxide powders of the Group 3a elements and oxide powders of elements selected from Zr, Hf. Nb, Ta and W, performing the primary sintering at a temperature of from 1600 to 1800° C., in an atmosphere containing a nitrogen gas under the atmospheric pressure ranging from 1 to 20 kgf/cm², then performing the secondary sintering at a temperature similar to, or lower than the primary sintering temperature in an atmosphere containing a nitrogen gas under the atmospheric pressure ranging from 100 to 2000 kgf/cm².

That is, in accordance with the second embodiment of the present invention, the silicon nitride powder and the oxide powders which are sintering additives are subjected to the primary sintering and the subsequent secondary sintering after being mixed and molded, as in the first embodiment.

As in the first embodiment, the primary sintering is performed till the relative density becomes roughly higher than 90%. The time required for the primary sintering differs depending on the size and the thickness of the sintered body, but it is about 1 to 24 hours, more preferably 4 to 12 hours. Subsequent secondary sintering is performed at a temperature similar to, or lower than the primary sintering temperature, and not lower than 1600° C., in an atmosphere containing a nitrogen gas. The atmospheric pressure containing a nitrogen gas is preferably from 100 to 2000 kgf/cm², as in the first embodiment.

Now, silicon nitride sintered bodies obtained by various experimental examples (inventive examples), according to the second embodiment of the present invention, performed on the above-mentioned consideration will be described, which by all means does not limit the present invention.

INVENTIVE EXAMPLE 1

In a ball mill containing balls made of silicon nitride were mixed 480 g of silicon nitride powder (produced by Ube Kosan, A34 X 05) having an average grain size of 0.5 μm, 12.5 g (2.5% by weight) of ytterbium oxide (produced by Nippon Yttrium, YHC3940620), 7.5 g (1.5% by weight) of hafnium oxide (Somekawa Rikagaku, 33238A) and 500 g of ethanol as a solvent for 60 hours.

After drying this mixed powder by using a rotary evaporator, the dried powder was passed through a sieve of 325 mesh, press molded at a molding pressure of 200 kg/cm² in a mold, and subjected to CIP (cold isostatic pressing) at a pressure of 4000 kg/cm² to make a test piece of 50 mm (length)×32 mm (width)×8 mm (thickness).

A test piece was subjected to primary sintering in an atmosphere containing a nitrogen gas under the atmospheric pressure of 9 kgf/cm² at 1800° C. for 4 hours to obtain a sintered body having a relative density of 92%. Furthermore, the test piece was subjected to sintering in an atmosphere containing a nitrogen gas under the atmospheric pressure of 200 kgf/cm² at 1800° C. for 2 hours to obtain a sintered body having a relative density of 95%.

This sintered body was subjected to three-point bending strength test conforming to JIS1601 at 1250° C. and 1450° C. The test result is shown in Table 2.

Figure 4:
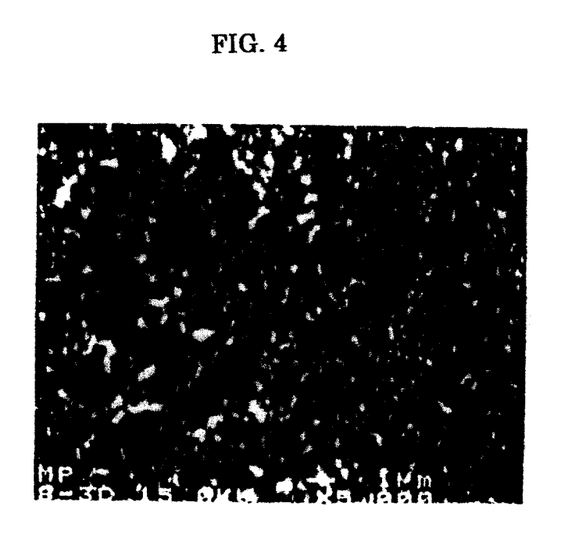
FIG. 4 is a photomicrograph (5000 magnifications) showing a structure of one inventive example of silicon nitride sintered body according to the second embodiment of the present invention.
Figure 5A:
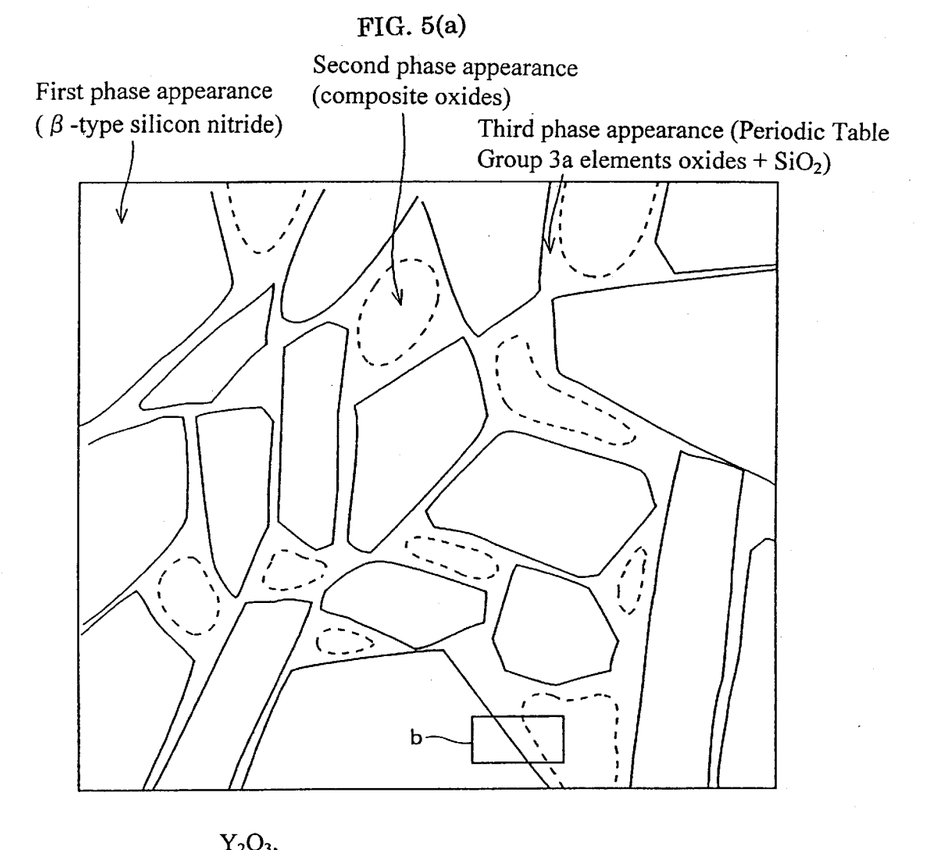
FIG. 5(a) is a diagram showing a structure of the silicon nitride sintered body and 5(b) is a magnified view showing a portion encircled by a segment b of (a)
Figure 5B:
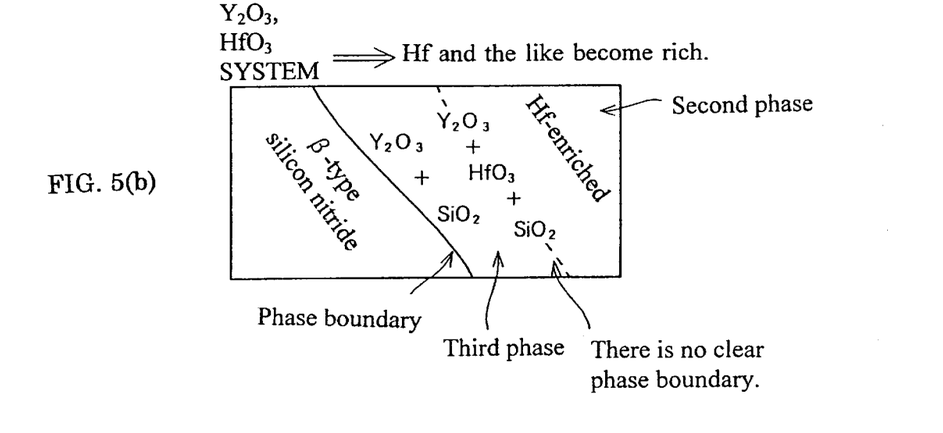

Furthermore, the structure of this sintered body is shown in the photomicrograph (5000 magnifications) of FIG. 4, FIG. 5(a) which is a diagram and FIG. 5(b) which is an enlarged view of a portion encircled by a segment b in FIG. 5(a).

As is obvious from these figures, the silicon nitride sintered body according to the second embodiment comprises a first phase (a matrix) with β-type silicon nitride particles in a pillar form, composite oxides comprising Hf oxide and Yb oxide to constitute the second phase intervenes in the clearance among these β-type silicon nitride particles, and composite oxides composed mainly of Yb oxide which constitutes the third phase intervenes between the first phase and the second phase.

As shown in FIG. 5(b), though the phase boundary between the first phase and the third phase exists clearly, the phase boundary between the third phase and the second phase does not exist clearly, and on the phase boundary between the first phase and the third phase, $Y_2O_3$ and $HfO_3$ systems are enriched while Hf and the like systems become rich toward the second phase.

INVENTIVE EXAMPLE 3

A test piece was prepared in the same manner as in the inventive example 1, except that the amount to be added of lutetium oxide (manufactured by Nippon Yttrium) having an average grain size of 1.0 μm was 2.5% by weight and the amount to be added of hafnium oxide was 1.5% by weight. And the test piece was subjected to the strength test in the same manner as in the inventive example 1. The obtained result is shown in Table 2.

In the structure of the obtained sintered body, composite oxides of Hf oxide and Lu oxide which constitute the second phase intervened in the clearance among β-type silicon nitride particles constituting the first phase.

COMPARATIVE EXAMPLE 1

A test piece was prepared in the same manner as in the inventive example 1, except that the amount to be added of ytterbium oxide was 4% by weight and hafnium oxide was not added, and the test piece was subjected to the strength test in the same manner as in the inventive example 1. The obtained result is shown in Table 2. From Table 2, it becomes obvious that the strength drastically decreases, especially by raising the temperature to conduct the three-point bending test from 1250° C. to 1450° C. And it will be seen that the high-temperature strength is increased by adding oxide powder of elements selected from Zr, Hf, Nb, Ta and W.

In the structure of the obtained sintered body, as shown in FIGS. 5(a) and 5(b), an amorphous phase was present in the clearance among β-type silicon nitride particles constituting the first phase.

TABLE 2

| | FIRST SINTERING ADDITIVE | | SECOND SINTERING ADDITIVE | | THREE-POINT BENDING STRENGTH (Mpa) | | |
|---|---|---|---|---|---|---|---|
| | ELEMENTS | AMOUNT TO BE ADDED wt % | ELEMENTS | AMOUNT TO BE ADDED wt % | 1250° C. | 1450° C. | MOLDING METHOD |
| INVENTIVE EXAMPLE 1 | Yb | 2.5 | Hf | 1.5 | 760 | 700 | PRESS + CIP |
| INVENTIVE EXAMPLE 2 | Y | 1.5 | ↑ | 2.5 | 750 | 670 | L-P INJECTION※ |
| INVENTIVE EXAMPLE 3 | Lu | 2.5 | ↑ | 1.5 | 710 | 700 | PRESS + CIP |
| COMPARATIVE EXAMPLE 1 | Yb | 4.0 | — | — | 650 | 400 | PRESS + CIP |

※L-P INJECTION = Low-Pressure Injection Molding

INVENTIVE EXAMPLE 2

A test piece was prepared in the same manner as in the inventive example 1, except that the amount to be added of yttrium oxide (manufactured by Nippon Yttrium) having an average grain size of 0.95 μm was 1.5% by weight and the amount to be added of hafnium oxide was 2.5% by weight, and the test piece was subjected to the strength test in the same manner as in the inventive example 1. The obtained result is shown in Table 2.

In the structure of the obtained sintered body, composite oxides of Hf oxide and Y oxide which constitute the second phase intervened in the clearance among β-type silicon nitride particles constituting the first phase.

As described above, in the silicon nitride sintered body according to the second embodiment, there are particles of oxide (composite oxide) constituting the second phase gotten into the clearance among β-type silicon nitride particles in a pillar form constituting the first phase. Since this oxide (composite oxide) and the silicon nitride particles are different in thermal expansion coefficient from each other, compressive stress works on the silicon nitride particles at a high temperature, thereby even if shear stress works, the grain boundary slip is hardly caused.

Now, a silicon nitride sintered body according to a third embodiment will be described from a view point of producing method thereof.

In the method of producing the silicon nitride sintered body according to the third embodiment, after molding a starting material which is obtained by adding sintering additives to a silicon nitride powder which is the main component, a resultant molded article is subjected to primary sintering and secondary sintering in a nitrogen atmosphere, wherein a temperature for the primary sintering is higher than a crystallizing temperature at which a grain boundary phase is crystallized but not 100° C. higher than the crystallizing temperature, a period of time for the primary sintering is within 6 hours from a time at which a contraction has started as β-type silicon nitride is formed densely, a pressure for the primary sintering is 0.1 kgf/cm$^2$~3.0 kgf/cm$^2$, a temperature for the secondary sintering is higher than the crystallizing temperature at which the grain boundary phase is crystallized but lower than the primary sintering temperature, and a pressure for the secondary sintering is 100 kgf/cm$^2$~2000 kgf/cm$^2$.

By setting the primary sintering temperature higher than the crystallizing temperature at which the grain boundary phase is crystallized but not 100° C. higher than the crystallizing temperature, the grain boundary phase can be securely crystallized, and more preferably, the primary sintering is conducted at a temperature higher than a crystallizing temperature at which the grain boundary phase is crystallized but not 50° C. higher than the crystallizing temperature.

The reason why the time of primary sintering is set within 6 hours from the time contraction has started as β-type silicon nitride is formed densely are described below.

Figure 7:
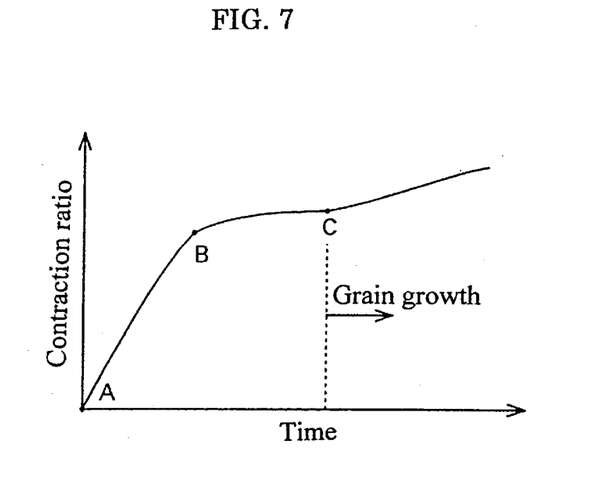
FIG. 7 is a graph showing the relation between time and contraction ratio when being sintered at a crystallization temperature, in a manufacturing process of a silicon nitride sintered body according to the third embodiment of the present invention.

Namely, FIG. 7 is a schematic graph showing a relation between time and contraction ratio when being sintered at a crystallization temperature. In the drawing, a lapse from A to B shows a contraction proceeding as α-type silicon nitride which is stable in a low temperature is rearranged (which is caused when melted additive intrudes among silicon nitride particles), and a lapse from B to C shows a phase transition proceeding from α-type silicon nitride to β-type silicon nitride which has excellent stability at a high temperature, and a lapse after C shows a proceeding of grain growth as the β-type silicon nitride is formed densely.

As is seen from this graph, if the primary sintering is completed before reaching a point C, the α-type silicon nitride still exists in the sintered body and tends to affect the high-temperature characteristics. Furthermore, if the primary sintering is performed exceeding the point C for a long period of time, an abnormal grain growth is caused to become a defect.

Therefore, the time of primary sintering or the primary sintering time should be such that the primary sintering is completed at point C, that is, when contraction starts as the β-type silicon nitride is formed densely, or at the longest, within 6 hours from the time when contraction has been started (point C).

Furthermore, the reason why the pressure of primary sintering is set to be 0.1 kgf/cm$^2$~3.0 kgf/cm$^2$ is that if it is below 0.1 kgf/cm$^2$, the silicon nitride is not densely formed and is decomposed, and if it exceeds 3.0 kgf/cm$^2$, a rearrangement is caused partially and defects such as pores and the like are easily caused. Preferably, the pressure may be from 0.5 kgf/cm$^2$~2.0 kgf/cm$^2$.

Furthermore, the reason why the temperature of secondary sintering is set to be higher than the crystallization temperature at which the grain boundary phase is crystallized but lower than the temperature of primary sintering is that by making the temperature higher than the crystallization temperature at which the grain boundary phase is crystallized, crystallization is promoted, and by making the secondary sintering temperature lower than that of primary sintering, an abnormal grain growth is prevented.

The reason why the pressure of secondary sintering (HIP) is 100 kgf/cm$^2$~2000 kgf/cm$^2$ is that if it is below 100 kgf/cm$^2$, the silicon nitride is not sufficiently densely formed, and if it exceeds 2000 kgf/cm$^2$, an excess solid solution of nitrogen is caused to affect the characteristic thereof. A preferable range of the secondary sintering pressure may be 200 kgf/cm$^2$~1000 kgf/cm$^2$.

The crystallization temperature of the grain boundary phase, regarded as a reference of the primary sintering temperature, depends on kinds of sintering additives to be added and the amount to be added to a mixture for the silicon nitride sintered body.

Therefore, a plurality of molded articles are prepared from starting materials to be practically sintered, and then these molded articles are sintered at different temperatures so that the crystallization temperature can be determined to be equal to a temperature at which the crystallinity of grain boundary phase becomes the highest. Based on the crystallization temperature, it will be possible to determine the temperature of primary sintering. Moreover, the contraction starting point as β-type silicon nitride is densely formed which becomes the reference of the primary sintering time can be determined from the relation between the progress time and the contraction ratio during a heating time at the primary sintering temperature determined as described above.

As the sintering additives, there can be used at least one kind selected from $Y_2O_3$, $Yb_2O_3$ and $Lu_2O_3$, or at least one kind selected from $Y_2O_3$, $Yb_2O_3$ and $Lu_2O_3$ and $SiO_2$, and their incorporating ratio is from 3% by weight to 20% by weight.

The reason why the incorporating ratio is from 3% by weight to 20% by weight is that if it is below 3% by weight, sinterability is deteriorated and dense sintered body cannot be obtained, and if it exceeds 20% by weight, the portion occupied by the grain boundary becomes large to deteriorate the high-temperature characteristic. Accordingly, it may preferably be from 5% by weight to 15% by weight.

Now, based on the above consideration, various experimental examples (inventive examples) of the method of producing the silicon nitride sintered body according to the third embodiment of the present invention will be described.

INVENTIVE EXAMPLE 1

Each of samples 1 to 4 was prepared from a powder obtained by mixing 460 g (89.5% by weight) of $Si_3N_2$, 40 g (7.8% by weight) of $Lu_2O_3$ and 14.1 g (2.7% by weight) of $SiO_2$, and then each sample was hot-pressed at one of temperatures shown in Table 3.

TABLE 3

| SAMPLE NO. | HOT PRESS TEMPERATURE | RELATIVE DENSITY | STRENGTH AT 1450° C. |
|---|---|---|---|
| 1 | 1650° C. | 59% | — |
| 2 | 1700° C. | 68% | — |
| 3 | 1750° C. | 91% | 800 Mpa |
| 4 | 1800° C. | 91% | 690 Mpa |

With regard to Samples 1 and 2, each sintered body was not sufficiently densely formed, but with regard to samples 3 and 4, each was confirmed from X-ray diffraction that $Lu_2Si_2O_7$ phase was sufficiently formed at temperatures of from 1750° C.–1800° C. Furthermore, it was confirmed that the peak corresponding to $Lu_2Si_2O_7$ phase of X-ray diffraction pattern decreases, since the grain boundary phase of the sample hot-pressed at a higher temperature is made amorphous. Therefore, the temperature at which the crystallinity of the grain boundary phase becomes the highest (the rate of crystallization is the highest) is considered to be 1750° C. to 1800° C., but since lower temperature has better effect to form a fine structure, it may be determined that 1750° C. is to be the crystallization temperature of this starting material.

Figure 8:
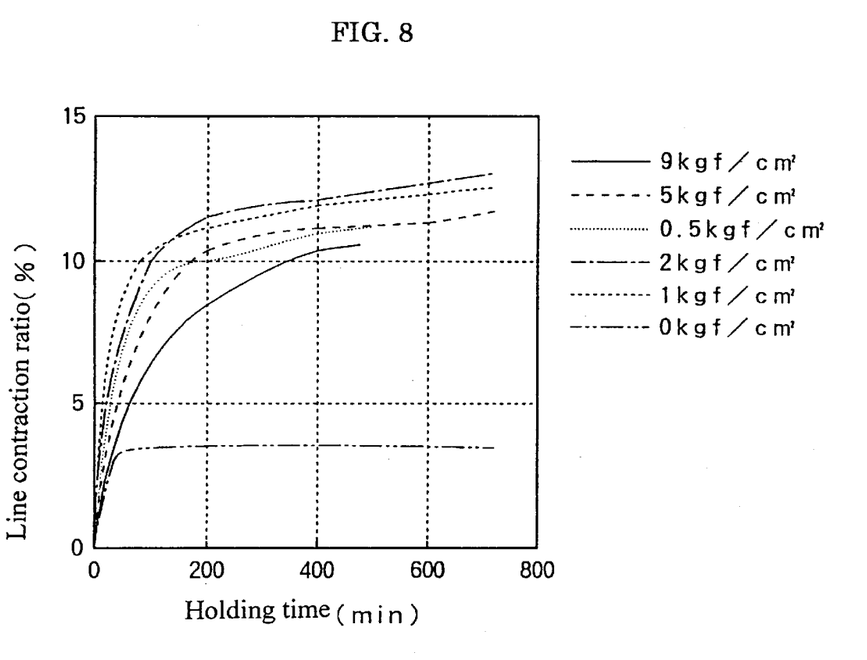
FIG. 8 is a graph showing the relation between holding time and linear contraction ratio for every ambient pressure.

Subsequently, the molded article which had been subjected to cold isostatic pressing (CIP) after press molding was sintered in a nitrogen atmosphere. The sintering temperature was 1750° C. (crystallization temperature) and sintering time was 12 hours, and ambient pressure was varied. The result is shown in FIG. 8. In addition, this FIG. 8 is a graph showing the segment A-B in FIG. 7 for every ambient pressure. And as the inclination of the segment is large, it shows that rearrangement is caused simultaneously in the whole molded article, and if rearrangement is caused simultaneously, the more the uniformity is increased.

From the graph in FIG. 8, it is understood that the pressure of primary sintering should be 0.1 kgf/cm$^2$ 3.0 kgf/cm$^2$, preferably 0.5 kgf/cm$^2$~2.0 kgf/cm$^2$.

Furthermore, from FIG. 8, it can be seen that the time required to start forming β-type silicon nitride densely (point corresponding to point C in FIG. 7) is about 8 hours (480 minutes).

From the above, conditions for the primary sintering and the secondary sintering were determined, and the respective sintering were performed to measure strength at 1450° C. and 1250° C. and Weibull coefficient. They are shown in Table 4 below. In Table 4, conditions for comparative examples 1 and 2 and the results are also shown.

In addition, the starting powder to be used in the inventive example 1 and starting powders to be used in comparative examples 1 and 2 were the same, and measurements for strength at 1450° C. and 1250° C. were carried out in the three-point bending test conforming to JIS R1601.

As is obvious from the comparative example 1, with regard to a sintered body obtained at a higher pressure, i.e., 9 kgf/cm$^2$, compared to the inventive example 1, its high-temperature strength after secondary sintering was low, and there were large variations found in the measured values.

As is obvious from the comparative example 2, the time for primary sintering was shorter than that in the inventive example 1, and as the temperature of primary sintering became high, the more the high-temperature strength was remarkably deteriorated.

TABLE 4

|  | INVENTIVE EXAMPLE 1 | COMPARTIVE EXAMPLE 1 | COMPARATIVE EXAMPLE 2 |
|---|---|---|---|
| PRIMARY SINTERING TEMP. | 1750° C. × 8 hrs | 1750° C. × 8 hrs | 1950° C. × 4 hrs |
| PRESSURE (N$_2$) | 2 kgf/cm$^2$ | 9 kgf/cm$^2$ | 9 kgf/cm$^2$ |
| DENSITY (g/cm$^3$) | 3.19 (87.2%) | 3.16 (86.3%) | 3.34 (91.2%) |
| SECONDARY SINTERING TEMP. | 1750° C. × 2 hrs | 1750° C. × 2 hrs | 1800° C. × 2 hrs |
| PRESSURE (N$_2$) | 1000 kgf/cm$^2$ | 1000 kgf/cm$^2$ | 1000 kgf/cm$^2$ |
| DENSITY (g/cm$^3$) | 3.36 (91.8%) | 3.35 (91.3%) | 3.36 (91.8%) |
| STRENGTH AT 1450° C. (Mpa) | X̶700 (n = 20) | 650 (n = 3) | 400 520 580 |
| WEIBULL COEFFICIENT | 17 | | |
| STRENGTH AT 1250° C. (Mpa) | X̶850 (n = 20) | 720 (n = 3) 670 520 | 580 |
| WEIBULL COEFFICIENT | 27 | | |

X̶shows intermediate value, and in particular there were large variations found in the high-temperature strength values in the comparative example 1.

INVENTIVE EXAMPLE 2

A starting powder was prepared by mixing 470 g (91.8% by weight) of Si$_3$N$_4$, 25 g (4.9% by weight) of Yb$_2$O$_3$, 5.0 g (1.0% by weight) of Y$_2$O$_3$, and 11.9 g (2.3% by weight) of SiO$_2$, this starting powder was molded, and then the crystallization temperature thereof was determined to be 1650° C. in the same manner as the inventive example 1. Further, the time required to start forming β-type silicon nitride densely (8 hours) was found, and based on these findings, conditions for primary sintering and secondary sintering were determined, and each sintering was performed. The conditions for sintering and the results are shown in Table 5 below. Incidentally, the starting powder to be used in a comparative example 3 in Table 5 was the same as that of the inventive example 2.

As is obvious from the comparative example 3, when the time of primary sintering was shorter than that in the inventive example 2, and the temperature and the pressure of primary sintering were high and the temperature of secondary temperature was also high, the high-temperature strength was drastically reduced.

TABLE 5

|  | INV. EXAMPLE 2 | COM. EXAMPLE 3 |
|---|---|---|
| PRIMARY SINTERING TEMP. | 1700° C. × 12 hrs | 1950° C. × 4 hrs |
| PRESSURE (N$_2$) | 2 kgf/cm$^2$ | 9 kgf/cm$^2$ |
| DENSITY (g/cm$^3$) | 3.13 (89.7%) | 3.22 (92.1%) |
| SECONDARY SINTERING TEMP. | 1650° C. × 2 hrs | 1800° C. × 2 hrs |
| PRESSURE (N$_2$) | 1000 kgf/cm$^2$ | 1000 kgf/cm$^2$ |
| DENSITY (g/cm$^3$) | 3.27 (93.6%) | 3.30 (94.5%) |
| STRENGTH AT 1250° C. (Mpa) | 700 | 610 |

INVENTIVE EXAMPLE 3

A starting powder was prepared by mixing 485 g (97.0% by weight) of Si$_3$N$_4$, 12.5 g (2.5% by weight) of Yb$_2$O$_3$, and 2.5 g (0.5% by weight) of Y$_2$O$_3$, this starting powder was molded, the crystallization temperature was determined to be 1650° C. in the same manner as in the inventive example 1. Further, the time required to start forming β-type silicon nitride densely (8 hours) were found, and based on these findings, conditions for primary sintering and secondary sintering were determined, and each sintering was performed. The conditions for sintering and the results are shown in Table 6 below. Incidentally, the starting powder to be used in a comparative example 4 in Table 6 was the same as that of the inventive example 3.

As is obvious from the comparative example 4, when the time of primary sintering was shorter than that in the inventive example 3, and the temperature and the pressure of primary sintering were high and the temperature of secondary temperature was also high, the high-temperature strength was drastically reduced.

TABLE 6

|  | INVENTIVE EXAMPLE 3 | COMPARATIVE EXAMPLE 4 |
|---|---|---|
| PRIMARY SINTERING TEMP. | 1700° C. × 12 hrs | 1950° C. × 4 hrs |
| PRESSURE ($N_2$) | 2 kgf/cm$^2$ | 9 kgf/cm$^2$ |
| DENSITY (g/cm$^3$) | 2.98 (89.0%) | 3.17 (94.7%) |
| SECONDARY SINTERING TEMP. | 1650° C. × 2 hrs | 1800° C. × 2 hrs |
| PRESSURE ($N_2$) | 1000 kgf/cm$^2$ | 1000 kgf/cm$^2$ |
| DENSITY (g/cm$^3$) | 3.18 (95.1%) | 3.25 (96.9%) |
| STRENGTH AT 1250° C. (Mpa) | 810 | 620 |

From the above Table 3, Table 4 and Table 5, it can be seen that the sintered body produced by a method within the scope of the third embodiment is clear to be excellent in high-temperature strength.

As described above, according to the third embodiment, in the method of producing a silicon nitride sintered body comprising molding a starting material obtained by mixing sintering additives with silicon nitride powder which is the main component, and performing primary sintering and secondary sintering in a nitrogen atmosphere, by setting each of the temperature of primary sintering, the time of primary sintering, the pressure of primary sintering, the temperature of secondary sintering and the pressure of secondary sintering in a proper range, it becomes possible to provide a silicon nitride sintered body which has a dense structure and little dispersion or variations in strength, and is uniform and excellent in high-temperature strength.

Furthermore, as for a method to determine conditions of primary sintering described above, if a plurality of molded articles are prepared from a starting material to be sintered, and these molded articles are sintered at different temperatures, the temperature at which the grain boundary phase is crystallized, which becomes the reference of primary sintering temperature, is determined from the temperature at which the crystallinity of the grain boundary phase becomes the highest, and the contraction starting point as β-type silicon nitride is densely formed, which becomes the reference of the primary sintering time, is determined from the relation between the progress time and the contraction ratio at the time of being heated at the primary sintering temperature, optimum conditions for the starting powder actually used, such as kinds of sintering additives, incorporating ratio and the like can be determined.

What is claimed is:

1. A method of producing a silicon nitride sintered body by molding a starting material comprising sintering additives and a silicon nitride powder to form a molded article and subjecting the molded article to a primary sintering and a secondary sintering in a nitrogen atmosphere, wherein the primary sintering and the secondary sintering are carried out under the following conditions:

a first temperature of said primary sintering being higher than a grain boundary temperature that a grain boundary phase is crystallized for said starting material and not more than 100° C. higher than said grain boundary temperature;

said primary sintering being up to 6 hours longer than a point in time at which a contraction has started as a dense β silicon nitride is formed during said primary sintering;

said primary sintering being at a pressure of 0.1 kgf/cm$^2$~3.0 kgf/cm$^2$;

a second temperature of said secondary sintering being higher than said grain boundary temperature at which the grain boundary phase is crystallized but lower than said first temperature of primary sintering for promoting the crystallinity of the grain boundary phase and preventing abnormal grain growth; and said secondary sintering being at a pressure of 100 kgf/cm$^2$~2000 kgf/cm$^2$;

wherein said grain boundary temperature at which the grain boundary phase is crystallized is determined by selecting a temperature at which a crystallinity of said grain boundary phase is the highest among a plurality of molded articles prepared from the starting material and sintered at different temperatures; and said contraction starting point time as said dense β silicon nitride is formed is determined from the relation between a progress time and a contraction ratio at the time of being heated at said primary sintering first temperature.

2. A method according to claim 1, wherein said sintering additives are at least one selected from $Y_2O_3$, $Yb_2O_3$, $Lu_2O_3$ and $SiO_2$, and the incorporating ratio is from 3% by weight to 20% by weight.

3. A method of producing a silicon nitride sintered body by the steps of:

molding a molded article of a starting material which comprises a mixture of a silicon nitride powder as a main component and plural sintering additives, said silicon nitride powder being 0.1 to 1.0 μm in average grain size, and said plural sintering additives include first and second sintering additives, said first sintering additive comprising oxide powders of at least one element of Group 3a elements, said second sintering additive comprising oxide powders of at least one element selected from Hf (hafnium), Nb (niobium), Ta (tantalum) and W (tungsten), said first sintering additive having an average grain size of 0.1 to 10 times as large as the average grain size of said silicon nitride powder and being incorporated in an amount ranging from 0.1 to 10% by weight of the mixture, said second sintering additive being particles and a part of the particles being of a grain size in the range from 15 to 50 times as large as the average grain size of said silicon nitride powder with a number of said part of said second sintering additive particles of said grain size being in a 5 to 50% range of a total number of particles of said second sintering additive, and said second sintering additive being incorporated in an amount ranging from greater than 0 to 10% by weight of the mixture; and sintering said molded article.

4. The method of producing a silicon nitride sintered body according to claim 3, wherein said step of sintering the molded article comprises a primary sintering in an atmosphere containing a nitrogen gas under a pressure in a range from 1 to 20 kgf/cm 2 at a range of 1600–1800° C., and subsequently a secondary sintering in an atmosphere containing a nitrogen gas under a pressure ranging from 100 to 2000 kgf/cm$^2$ at a temperature lower than the range of said primary sintering.

5. The method of producing a silicon nitride sintered body according to claim 4, wherein said primary sintering is performed in an atmosphere containing a nitrogen gas under a pressure ranging from 1 to 9 kfg/cm$^2$, and said first sintering additive has the average grain size set to be 0.5 to 5 times as large as the average grain size of said silicon nitride powder and is incorporated in an amount ranging from 1 to 5% by weight to the mixture.

6. The method of producing a silicon nitride sintered body according to claim 3, wherein said step of sintering the molded article comprises a primary sintering and a secondary sintering and said silicon nitride sintered body comprises:

a first phase including β silicon nitride in a pillar form, a second phase including oxides of at least one element selected from Hf (hafnium), Nb (niobium), Ta (tantalum) and W (tungsten) or composite oxides of the aforesaid oxides and oxides of at least one element selected from the Periodic Table Group 3a elements, and a third phase mainly including oxides of at least one element selected from the Periodic Table Group 3a element, said second phase being present among β silicon nitride particles forming said first phase.

7. The method of producing a silicon nitride sintered body according to claim 3, wherein the average grain size of said first sintering additive is set to be 0.5 to 5 times as large as the average grain size of said silicon nitride powder, and incorporating an amount of said first sintering additive is set to be 1 to 5% by weight.

8. The method of producing a silicon nitride sintered body according to claim 3, wherein the Group 3a element as said first sintering additive is one selected from Y (yttrium), Yb (ytterbium) and Lu (lutetium).

* * * * *